(12) United States Patent
Hayes et al.

(10) Patent No.: US 11,301,781 B2
(45) Date of Patent: Apr. 12, 2022

(54) SYSTEMS AND METHODS IMPLEMENTING AN INTELLIGENT OPTIMIZATION PLATFORM

(71) Applicant: Intel Corporation, Santa Clara, CA (US)

(72) Inventors: Patrick Hayes, San Francisco, CA (US); Michael McCourt, San Francisco, CA (US); Alexandra Johnson, San Francisco, CA (US); George Ke, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/796,489

(22) Filed: Feb. 20, 2020

(65) Prior Publication Data

US 2020/0202254 A1 Jun. 25, 2020

Related U.S. Application Data

(63) Continuation of application No. 16/243,361, filed on Jan. 9, 2019, now Pat. No. 10,607,159, which is a
(Continued)

(51) Int. Cl.
*G06N 20/00* (2019.01)
*G06F 9/54* (2006.01)
(Continued)

(52) U.S. Cl.
CPC ............. *G06N 20/00* (2019.01); *G06F 9/54* (2013.01); *G06N 5/003* (2013.01); *G06N 7/005* (2013.01); *G06N 20/20* (2019.01); *G06N 99/00* (2013.01)

(58) Field of Classification Search
CPC ...... G06N 99/005; G06N 20/00; G06N 99/00; G06N 20/20; G06N 5/003; G06N 7/005; G06F 9/54
(Continued)

(56) References Cited

U.S. PATENT DOCUMENTS 7,363,281 B2 * 4/2008 Jin ..................... G06N 3/126
 706/13
8,364,613 B1 1/2013 Lin et al.
(Continued)

FOREIGN PATENT DOCUMENTS

WO 2018213119 11/2018

OTHER PUBLICATIONS

Bergstra, et al., "Hyperopt: A Python Library for Model Selection and Hyperparameter Optimization", Computational Science & Discovery, Aug. 2015.
(Continued)

*Primary Examiner* — Lut Wong
(74) *Attorney, Agent, or Firm* — Hanley, Flight & Zimmerman, LLC

(57) ABSTRACT

A system and method includes receiving a tuning work request for tuning an external machine learning model; implementing a plurality of distinct queue worker machines that perform various tuning operations based on the tuning work data of the tuning work request; implementing a plurality of distinct tuning sources that generate values for each of the one or more hyperparameters of the tuning work request; selecting, by one or more queue worker machines of the plurality of distinct queue worker machines, one or more tuning sources of the plurality of distinct tuning sources for tuning the one or more hyperparameters; and using the selected one or more tuning sources to generate one or more suggestions for the one or more hyperparameters, the one or
(Continued)

more suggestions comprising values for the one or more hyperparameters of the tuning work request.

22 Claims, 3 Drawing Sheets

Related U.S. Application Data continuation of application No. 15/977,168, filed on May 11, 2018, now Pat. No. 10,217,061.

(60) Provisional application No. 62/608,076, filed on Dec. 20, 2017, provisional application No. 62/608,090, filed on Dec. 20, 2017, provisional application No. 62/593,785, filed on Dec. 1, 2017, provisional application No. 62/578,788, filed on Oct. 30, 2017, provisional application No. 62/540,367, filed on Aug. 2, 2017, provisional application No. 62/507,503, filed on May 17, 2017.

(51) Int. Cl.
 *G06N 20/20* (2019.01)
 *G06N 5/00* (2006.01)
 *G06N 7/00* (2006.01)
 *G06N 99/00* (2019.01)

(58) Field of Classification Search
 USPC .................................................. 706/45, 12
 See application file for complete search history.

(56) References Cited

U.S. PATENT DOCUMENTS

| | | | |
|---|---|---|---|
| 9,786,036 B2 | 10/2017 | Annapureddy | |
| 10,217,061 B2 | 2/2019 | Hayes et al. | |
| 10,282,237 B1 | 5/2019 | Johnson et al. | |
| 10,379,913 B2 | 8/2019 | Johnson et al. | |
| 10,445,150 B1 | 10/2019 | Johnson et al. | |
| 10,528,891 B1 | 1/2020 | Cheng et al. | |
| 10,558,934 B1 | 2/2020 | Cheng et al. | |
| 10,565,025 B2 | 2/2020 | Johnson et al. | |
| 10,607,159 B2 | 3/2020 | Hayes et al. | |
| 10,621,514 B1 | 4/2020 | Cheng et al. | |
| 10,740,695 B2 | 8/2020 | Cheng et al. | |
| 2007/0019065 A1 | 1/2007 | Mizes | |
| 2008/0183648 A1* | 7/2008 | Goldberg | G06N 20/10 706/13 |
| 2009/0244070 A1 | 10/2009 | Mattikalli et al. | |
| 2010/0083196 A1 | 4/2010 | Liu | |
| 2015/0288573 A1 | 10/2015 | Baughman et al. | |
| 2016/0110657 A1* | 4/2016 | Gibiansky | G06N 20/00 706/12 |
| 2016/0132787 A1* | 5/2016 | Drevo | G06N 20/10 706/12 |
| 2016/0232540 A1 | 8/2016 | Gao et al. | |
| 2017/0124487 A1 | 5/2017 | Szeto et al. | |
| 2018/0121797 A1 | 5/2018 | Prabhu et al. | |
| 2018/0129892 A1 | 5/2018 | Bahl et al. | |
| 2018/0240041 A1 | 8/2018 | Koch et al. | |
| 2018/0356949 A1 | 12/2018 | Wang et al. | |
| 2019/0220755 A1 | 7/2019 | Carbune et al. | |
| 2020/0151029 A1 | 5/2020 | Johnson et al. | |
| 2020/0302342 A1 | 9/2020 | Cheng et al. | |

OTHER PUBLICATIONS

International Search Report and Written Opinion for International Application No. PCT/US18/32248 dated Jul. 30, 2018.

United States Patent and Trademark Office, "Non-Final Office Action," dated Jul. 5, 2018 in connection with U.S. Appl. No. 15/977,168, 13 pages.

United States Patent and Trademark Office, "Notice of Allowance," dated Nov. 28, 2018 in connection with U.S. Appl. No. 15/977,168, 5 pages.

United States Patent and Trademark Office, "Non-Final Office Action," dated Sep. 11, 2019 in connection with U.S. Appl. No. 16/243,361, 10 pages.

United States Patent and Trademark Office, "Notice of Allowance," dated Dec. 31, 2019 in connection with U.S. Appl. No. 16/243,361, 7 pages.

Zhou et al., "Combining Global and Local Surrogate Models to Accelerate Evolutionary Optimization," IEEE Transactions on Systems, Man, and Cybernetics, Part C, vol. 37, Issue 1, Jan. 2007, 12 pages.

Bergstra et al., "Hyperopt: a Python Library for Model Selection and Hyperparameter Optimization," Computational Science & Discovery, 2015, 25 pages.

International Searching Authority, "International Search Report," dated Jul. 30, 2018 in connection with International Patent Application No. PCT/US2018/32248, 2 pages.

International Searching Authority, "Written Opinion," dated Jul. 30, 2018 in connection with International Patent Application No. PCT/US2018/32248, 7 pages.

International Searching Authority, "International Preliminary Report on Patentability," dated Nov. 19, 2019 in connection with International Patent Application No. PCT/US2018/32248, 8 pages.

European Patent Office, "Communication Pursuant to Rules 70(2) and 70a(2) EPC," issue din connection with European Application No. 18801697.6, dated Apr. 13, 2021, 1 page.

* cited by examiner

200

Receiving Optimization Work Request 210

Implementing Plurality of Work Machines S220

Selecting Optimization Source(s) S230

Returning Response Using Partial Info S240

Storing Generated Suggestions S250

Implementing Optimization Feedback Loop S255

SYSTEMS AND METHODS IMPLEMENTING AN INTELLIGENT OPTIMIZATION PLATFORM

CROSS-REFERENCE TO RELATED APPLICATIONS

This application is a continuation of U.S. patent application Ser. No. 16/243,361, filed 9 Jan. 2019, now U.S. Pat. No. 10,607,159, which is a continuation of U.S. patent application Ser. No. 15/977,168, filed on May 11, 2018, now U.S. Pat. No. 10,217,061, which claims the benefit of U.S. Provisional Application No. 62/507,503, filed 17 May 2017, U.S. Provisional Application No. 62/540,367, filed 2 Aug. 2017, U.S. Provisional Application No. 62/593,785, filed 1 Dec. 2017, U.S. Provisional Application No. 62/608,090, filed 20 Dec. 2017, U.S. Provisional Application No. 62/608,076, filed 20 Dec. 2017, and U.S. Provisional Application No. 62/578,788, 30 Oct. 2017, all of which are incorporated in their entireties by this reference.

TECHNICAL FIELD

The inventions relate generally to the computer optimization and machine learning fields, and more specifically to a new and useful intelligent hyperparameter optimization in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained and based on the hyperparameters of the machine learning model set prior to the training of the model. As referenced in passing, the hyperparameters of the machine learning models are parameters whose values are set prior to the commencement of the machine learning process rather than derived by the machine learning model during training. Examples include the number of trees in a random forest or the number of hidden layers in a deep neural network. Adjusting the values of the hyperparameters of a machine learning model by any amount typically results in a large impact on a performance of the machine learning model and correspondingly, a computational performance of a computer implementing the machine learning model.

However, many existing machine learning models are not implemented with optimal hyperparameters well-suited for achieving the best predictive performances and/or classification performances. Rather, the many existing machine learning models are implemented with default hyperparameters that have not been tuned or optimized for a specific computing problem for which the machine learning models are being used.

Thus, there is a need in the machine learning and computing field to create an improved optimization platform to test and improve machine learning models (e.g., in-product machine learning models). The embodiments of the present application described herein provide technical solutions that address, at least, the need described above, as well as the technical deficiencies of the state of the art described throughout the present application.

DESCRIPTION OF THE PREFERRED EMBODIMENTS

Figure 1:
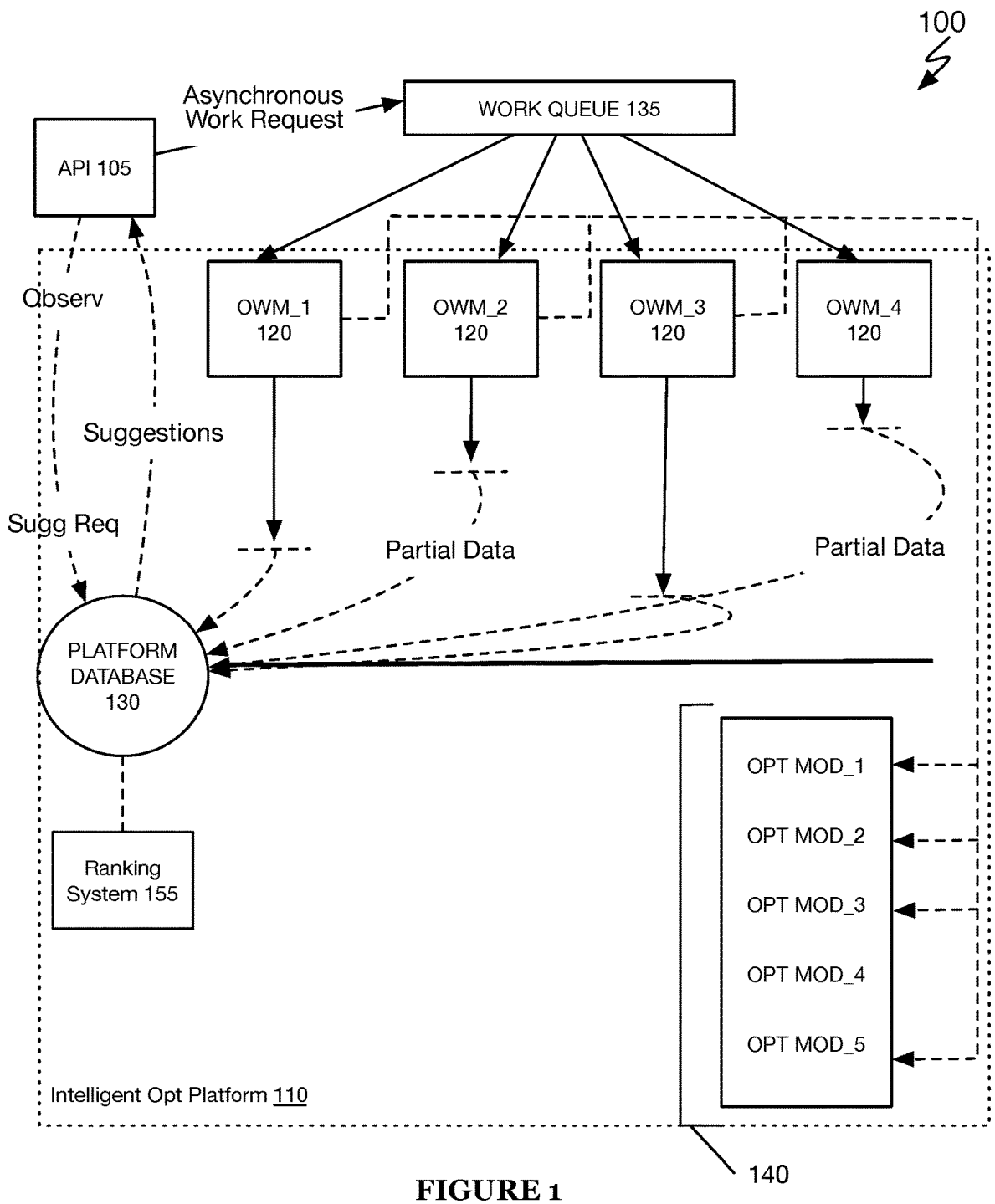
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing machine learning models tend to lack in predictive performance as well as speed in computation due to a lack of optimal hyperparameters used in the machine learning models during training. The lack of optimized hyperparameters well-suited to an underlying computing problem or the like adversely affect the computational capabilities of the machine learning model, in that, the resulting predictions or solutions of the model may not be accurate and the speed of computation of the machine learning model may be slow because the un-optimized or poorly optimized hyperparameters of the model may result in an increased workload (e.g., increased required computer processing, increased required data storage, etc.) to the computing system implementing the model and thereby resulting in many efficiencies therein.

Additionally, even in the circumstance that an attempt is made to optimize some of the hyperparameters of a machine learning model, the attempt to optimize the hyperparameters may fail due to many common optimization errors including: using inappropriate metrics and assumptions to test hyperparameters of an associated machine learning model or the like; overfitting a machine learning model during training that often results in a poor fit of the model to out of sample data or unseen data; using too few hyperparameters and failing to optimize all hyperparameters of a machine learning model; unskilled or improper hand-tuning, which is a highly inefficient optimization strategy at which humans are poor at performing high dimensional, non-convex optimization; grid searching over a space of possible hyperparameters which may grow the number of times a machine learning model must be evaluated due to an increase in dimensionality (i.e., increased hyperparameters); random searching which uses no intelligence in the optimization method and may result in unnecessarily high variance.

Accordingly, unintelligent optimization attempts of hyperparameters (or other model parameters) may result in high computational costs (e.g., high computer processing resources expenditures, etc.).

The embodiments of the present application, however, provide an intelligent optimization platform that functions to optimize hyperparameters and/or parameters of any type of model with significantly fewer evaluation thereby saving computational resources while greatly improving an overall predictive and/or computational performance of a model. In embodiments of the present application, the intelligent optimization platform includes an ensemble of hyperparameter optimization models or hyperparameter optimization sources (i.e., tuning sources), which may include a combination of several distinct machine learning models and Bayesian optimization algorithms that may work in selective combinations to expediently tune hyperparameters or various parameters of complex external systems, simulations, and models.

Further, the embodiments of the present application include an intuitive and simplified Application Programming Interface (API) that enables users and/or developers to easily configure a work request, such as a hyperparameter optimization work request. The intuitive and simplified API is preferably in operable communication with the intelligent optimization platform. A hyperparameter optimization work request as referred to herein generally relates to a request to optimize one or more hyperparameters of a model to improve a performance or some objective function of the external model. The hyperparameter optimization work request may include an identification of the hyperparameters a user desires to optimize together with constraints or parameters required for experimenting or performing optimization trials using the intelligent optimization system and/or methods described herein. The optimization work request may generally be generated using an API that is in operable communication with the system 100, as described below. In a preferred embodiment, the optimization work request functions to trigger an operation of the intelligent optimization platform performing computations using the hyperparameters of the optimization work request. Additionally, in embodiments of the present application, using a limited number of simplified API calls, it is possible to integrate the sophisticated ensemble of Bayesian optimization techniques of the intelligent optimization platform to augment an existing machine learning pipeline.

Collaboratively, the intelligent optimization platform preferably functions to improve the computational capabilities of a machine learning model, such that a subject machine learning model performs at high levels of accuracy and further, computes predictions, classification labels, suggestions, and other outcomes faster (e.g., up to one hundred times faster or more improvement in machine learning models, etc.) than un-optimized or poorly optimized machine learning models or other models. This, in turn, improves the functionality and operational speed and efficiency of the underlying computing system executing the machine learning model or other model.

1. System for Implementing an Intelligent Optimization Platform

As shown in FIG. 1, a system 100 includes an intelligent application program interface (API) 105, an intelligent model optimization (tuning) platform 110, a (cluster) plurality of queue working machines 120, a platform database 130, a shared work queue 135, and an ensemble of optimization (tuning sources) models 140.

The system 100 preferably implements an intelligent model optimization platform 110 including an ensemble of Bayesian optimization processes and machine learning techniques that function to automate an optimization or tuning of features (including weights or coefficients of features) of a model, architecture of a model, and hyperparameters of a model using an ensemble of Bayesian optimization techniques.

The system 100 functions to implement an intelligent Application Program Interface (API) 105 for interacting with and initiating complex optimization trials via the remote intelligent optimization platform 110. The API 105 may be specifically designed to include a limited number of API endpoints that reduce the complexity in creating an optimization work request, implementing optimization trials using optimization data of an optimization work request, obtaining suggestions and/or results of the optimization trials, and potentially implementing an optimization feedback loop until a suitable optimization of an objective function of a subject external model associated with a work request is achieved in a minimal amount of time. The optimization work request, as referred to herein, generally relates to an API request that includes one or more hyperparameters of a model, a complex system, or simulation that a user desires to optimize and one or more constraints that the user desires for the optimization trials performed by the intelligent optimization platform 110 based on the work request. The one or more constraints may include maximum and minimum values for each of the hyperparameters of a work request thereby defining a universe of values that may be returned in an optimization (tuning session) trial. The one or more constraints may additional include an optimization (tuning) budget that limits a number of optimization trials that may be performed by the intelligent optimization platform when tuning the hyperparameters.

In a preferred embodiment, the API 105 comprises a Representational State Transfer (ReST) API that relies mainly on a stateless, client-server, cacheable communications protocol and in many cases, the ReST API uses the HTTP protocol in connecting and interacting with software applications over the web and cloud (distributed networked systems) services efficiently.

The API 105 may additionally be configured with logic that enables the API 105 to intelligently parse optimization work request data and/or augment the optimization work request data with metadata prior to passing the optimization work request to the shared work queue 135 of the intelligent optimization platform 110. Preferably, the shared work queue 135 is an asynchronous work queue such that optimization work request stored therein may be pulled by any of the intelligent queue worker machines 120 at different times and without necessarily waiting until a prior (e.g., pending or currently executed) optimization work request is fully processed or completed by the intelligent optimization platform. Accordingly, the asynchronous nature of the shared work queue 135 enables each of the queue working machines to independently access and process an optimization work request.

The intelligent optimization platform 110 includes the plurality of queue worker machines 120 (which may also be referred to herein as optimization worker machines or API workers), the platform database 130, the shared work queue 135 and the ensemble of optimization models (tuning sources) 140. The intelligent optimization platform 110 generally functions to interact with the API server implementing the intelligent API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provide speed in computing efficiencies in the exploration and exploitation processes (generally, optimization) of features, hyperparameters, models and system architectures. Additionally, or alternatively, the asynchronous processing of work requests enables generation of response to a work request with partial computation states.

The intelligent optimization platform 110 may be implemented using a combination of networked hardware computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. However, it shall be noted that the intelligent optimization platform 110 may be implemented with any private and/or public computing servers including combinations thereof. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to disparate services operating on the intelligent optimization platform 110 that executes code asynchronously with respect to other services or queue working machines of the platform 110. In some embodiments, each of the plurality of intelligent queue worker machines 120 include disparate modules that may function to operate and/or process tasks independently of other intelligent queue worker machines. In some embodiments, each of the plurality of intelligent queue worker machines may be implemented across multiple In some embodiments, each of the plurality of intelligent queue worker machines 120 functions to selectively trigger one or more optimization work requests to one or more optimization models (sources) engines of the ensemble of optimization models 140. And, once the work on the optimization work request is completed by the selected optimization model(s), the queue working machine returns the responses or results to the platform database 130 and stores them therein.

The plurality of intelligent queue worker machines 120 may be specifically configured with logic that enables each of the intelligent queue worker machines 120 to make dynamic and intelligent decisions in the selections of an ensemble component of the ensemble of optimization models 140 for processing work (e.g., an optimization trial or the like). That is, each of the plurality of intelligent queue worker machines 120 may function to selectively choose one or more optimization models of the ensemble 140 to execute one or more portions of an optimization work request.

In some embodiments, the plurality of intelligent queue worker machines 120 may selectively switch between different models or optimization sources of the ensemble 140 based on a receipt of an intervening optimization work request. An intervening optimization work request as referred to herein may relate to a cognate or subsequent optimization work request that follows and is related to an initial optimization work request. The intervening optimization work request may be intervening because the request is made during the processing of the initial optimization work request and before the initial optimization work request is completed. Accordingly, a user via the intelligent API 105 may make an intervening optimization work request prior to receiving the suggestions or output of the initial optimization request. In such embodiments, according to a partial complete state of the initial optimization request, the plurality of intelligent queue worker machines may selectively switch between optimization sources of the ensemble 140 for performing one or more tasks for optimizing hyperparameters of the initial optimization work request to expedite the generation of suggestions to return in response to the intervening optimization work request. For instance, if the optimization platform is seeking optimal suggestions for hyperparameters using a relatively slower but more accurate optimization source (e.g., TPE or SPE) at a time prior to receiving an intervening optimization work request, upon receipt of an intervening optimization work request, the optimization platform may operate one or more of the intelligent queue worker machines to redirect or reallocate the optimization of the hyperparameters to another optimization source (e.g., MOE) of the ensemble 140 that may be faster at generating suggestions but with less accuracy. In this way, the optimization platform may be able to quickly generate suggestions to respond to the intervening optimization work request ahead of a scheduled completion time of the initial optimization work request.

The ensemble of optimization models 140 preferably includes a plurality of disparate optimization sources (e.g., Bayesian optimization algorithms) or machine learning (tools) models that operate to optimize or tune hyperparameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together to generate suggestions or optimization output(s). Each of these models may be individually selectable or selectable in combination by the intelligent worker queue machines 120 for performing one or more optimization tasks.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work requests, from the shared work queue 135 received via the API 105, with the ensemble of optimization models 140.

A first example intelligent queue worker machine may function to implement Modelfit or Hyperopt that typically functions to tune one or more of the hyperparameters of the optimization models of the ensemble 140 concurrently with the processing of the optimization work requests received via the API 105. In one implementation, Modelfit or Hyperopt may be used to tune hyperparameters of one of the optimization models of the ensemble 140. After receiving a set of observations based on the suggestions for the set of hyperparameters, the first queue worker machine may implement Modelfit or Hyperopt to model fit the hyperparameters of the selected optimization models in order to generate improved and new values for the set of hyperparameters via Nextpoints or the like. In some embodiments, the first queue worker machine may function to optimize the hyperparameters of the selected optimization models (i.e., an internal model) of the ensemble 140 based on a return of a set of observations. However, it shall be noted that observations may be generated in any suitable manner including in the absence of suggestions by the system 100.

A second example intelligent queue working machine may function to implement Nextpoints that typically functions to generate or suggest new, optimized values for the hyperparameters of the optimization work request. Accordingly, such intelligent queue working machine may function to select one or more of the optimization models of the ensemble 140, such as one or more machine learning models or one or more tailored Bayesian tuning algorithms, for generating the new, optimized hyperparameter values.

A third example intelligent queue worker machine may function to implement an Importance algorithm that typically functions to judge or determine a relative importance of the hyperparameters submitted with the optimization work request (i.e., hyperparameters of an external model). This example intelligent queue worker machine may additionally function to analyze and determine an importance of features, hyperparameters, and architectures of the optimization models with respect to a given optimization work request; meaning the identified importance hyperparameters, features, or the like may have a significant impact on an account of a suggestion or generated hyperparameter values. Accordingly, the intelligent queue worker machine of such example may function to recognize different hyperparameters and/or features of an optimization model as being important and non-important based on the optimization work request data (e.g., based on the hyperparameters to be optimized). Thus, the intelligent queue worker machine may function to assign or attribute distinct importance values to the hyperparameters and/or features of the optimization models so that these hyperparameters and the like may be ranked and considered with greater weight in a correlated process, such as re-tuning via Hyperopt or the like.

It shall be noted that the plurality of intelligent optimization worker machines 120 may not be limited to the above-noted examples, but rather may be an extensible group of intelligent machines that may be modified to include additional and/or different intelligent worker machines.

The platform database 130 may function to collect and store any or all values generated by the system 100 including values generated when executing an optimization work request by the intelligent optimization platform 110 and/or values generated when re-tuning various internal optimization models or sources, such as the optimization models of the ensemble 140. Additionally, the platform database 130 may function to store state (or status) data of all tuning operations performed during an execution of an optimization work request. Specifically, each of the plurality of intelligent queue worker machines 120 may function to store within the platform database 130 optimized hyperparameter values, optimized parameter values of an optimization work request, state data (e.g., level of completion or status of completion of a tuning operation or of optimization work request), suggestions, surrogate models, partial information responses, and the like. These stored values and/or suggestions may be stored along with metadata, such as timestamp data (i.e., time of generation by the system 100), identification data of the optimization model(s) or source(s) that produced the values or suggestions, trial data (e.g., the number optimization trial, such as Nth optimization trial out of 10 executed optimization trials), and the like. The API 105 may be operable communication with the platform database 130 via a communication network and may function to pull suggestions and/or response data via an API call or request to the platform database 130.

The machine learning models, optimization models or sources, and/or the ensemble of machine learning models may employ any suitable optimization algorithms and/or machine learning technique including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models 140 to generate a surrogate (or proxy) model of the external model of a client or service provider that can be used to test the uncertainty and/or the likelihood that a candidate data point would perform well in the external model. In some embodiments, the generated surrogate model may represent a hypothesis generated by the system 100 of an external model into which the hyperparameters may be set or used. In some embodiments, the system may generate the surrogate model based at least in part on a proposed objective function used to optimize the hyperparameters. Accordingly, the generated surrogate model may be an estimation of the external model (when a structure and/or features of the external model are not known to the platform). In one example, the system 100 may function to obtain from the platform database 130 hyperparameter values of a most recent job or optimization trial of a first intelligent queue worker machine implementing Hyperopt and cause one of the optimization models of the ensemble 140, such as MOE, to generate the surrogate model using the hyperparameter values to test how well the candidate hyperparameter value data points may perform (i.e., how well the candidate data points maximize or minimize a defined objective function or the like).

The system 100 may also implement a ranking system 155 that functions to rank the suggestions for a given optimization work request (or across multiple optimization trials for a given optimization work request) such that the suggestions having parameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable communication network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

2. Method for Implementing an Intelligent Optimization Platform

Figure 2:
FIG. 2 illustrates an example method in accordance with one or more embodiments of the present application.
Figure 3:
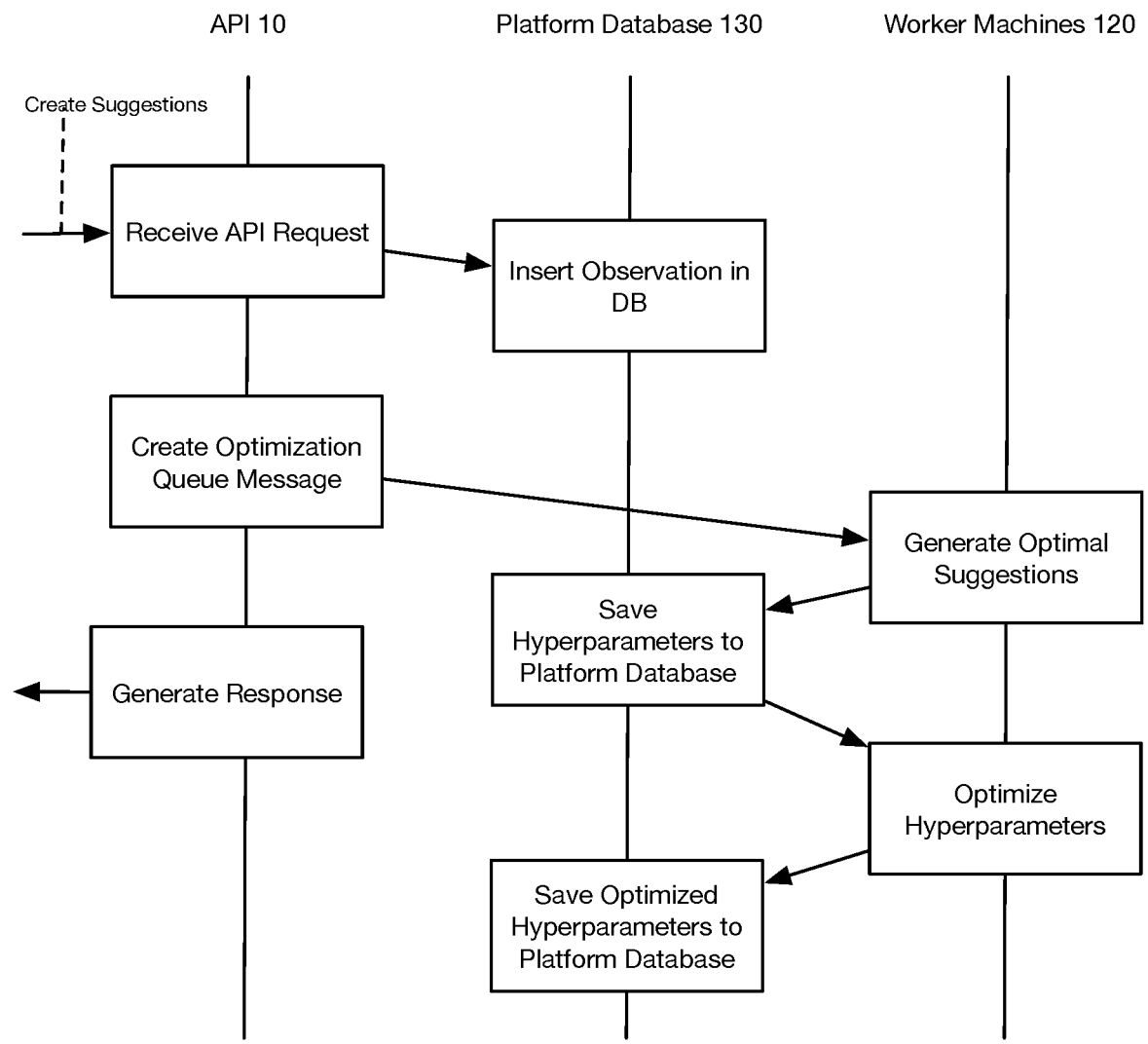
FIG. 3 illustrates a schematic representation of a mixed system and process flow for implementing an intelligent optimization platform in accordance with one or more embodiments of the present application.

As shown in FIG. 2, a method 200 for implementing an intelligent optimization platform includes receiving an optimization work request S210, executing the optimization work request with a plurality of disparate optimization work machines S220, dynamically selecting one or more optimization models of an ensemble of optimization models based on the optimization work request data S230, and making available the suggestions to the intelligent API S250. The method 200 may optionally include returning an API response based on partial information S240 and implementing an optimization feedback loop S255. Additionally, FIG. 3 illustrates a mixed system block and exemplary process flow for implementing the intelligent optimization platform.

S210, which includes receiving an optimization work request, functions to receive via an intelligent Application Program Interface (API) an optimization work request. The intelligent API may be implemented as a client application on a client device, as a web browser, or any suitable interface accessible to a remote user system. Within the API, the remote user may be able to provide one or more details of the model that the user desires tuned or optimized by an intelligent optimization platform implemented by a system (e.g., system 100) implementing the method 200.

The optimization work request received by the intelligent optimization platform may include, at a minimum, an identification of hyperparameters that the work request is seeking to optimize. A hyperparameter as referred to herein generally relates to a parameter whose value is set before the learning and/or training process of a machine learning model (complex system or simulation) begins rather than derived during training. Typically, the number of hyperparameters included in the optimization work request may govern the dimensions of a trial object generated by a system implementing the method 200. For instance, if the optimization work request includes two hyperparameters, such as x and y, that may take on numeric values a system implementing the method 200 may function to create a two-dimensional optimization trial containing two hyperparameter objects: x and y.

S210 may additionally function to define an objective function that best expresses or relates to an overall goal (e.g., improved accuracy, improved speed/efficiency of a machine learning model, etc.) for improving the external model. Specifically, using the hyperparameters and constraint data of a subject optimization work request, S210 may function to estimate an objective function for the subject optimization work request that should be maximized or minimized by tuning the hyperparameters of the objective function.

A system implementing the method 200 may function to generate values for the hyperparameters of the optimization work request that function to maximize or minimize the relevant objective of the machine learning model that implements the submitted hyperparameters. For example, the optimization work request may function to trigger one or more tuning operations that tune or optimize example hyperparameters x and y to increase a predictive accuracy (maximized capability) of a subject machine learning model or the like. It shall be noted that any suitable objective of a machine learning model may be improved based on the tuning of one or more of the hyperparameters of the model including predictive accuracy and/or predictive speed, classification accuracy and/or classification speed, inference accuracy and/or inference speed, decisioning accuracy and/or decisioning speed, and the like.

The optimization work request may additionally include the bounds for each of the hyperparameters. A bound, as referred to herein, typically refers to a range of values that a hyperparameter can occupy. Accordingly, the bound for a hyperparameter functions as a constraint (e.g., a min/max value constraint, range constraint, multiple discrete ranges of values, etc.) for a given hyperparameter that cannot be exceeded during an optimization trial (or tuning operation) of the one or more hyperparameters of the optimization work request. Additionally, or alternatively, the bounds may include a plurality of discrete values and/or a combination of value ranges and discrete values that a hyperparameter may occupy.

Additional optimization work request inputs or data may include, but not limited to, conditions, an optimization budget value, metadata, and the like that may be useful inputs in defining an objective function for an external model, constraining one or more tuning operations, and the like. These additional optimization work request inputs may function to affect or govern, in some amount, a manner in which the optimization trials are performed or otherwise, results thereof returned back via the API.

S220, which includes implementing an optimization or tuning based on the optimization work request with a plurality of disparate optimization worker machines, functions to pass the optimization work request to a shared work queue that is accessible by the plurality of disparate optimization worker machines. In some embodiments, the API includes logic that functions to pre-process the optimization work request by augmenting the optimization work request data with metadata tags, parsing optimization work request data into segments that more readily consumable by the plurality of queue worker machines, and the like prior to passing the optimization work request data to the shared work queue. In this way, portions of the optimization work request may be stored such that the different portion of the optimization worker request may only be accessed by specific ones of the optimization work machines when a combination of optimization worker machines are used to performing tuning operations for a single optimization work request.

The shared work queue may be a specifically configured database that is preferably accessible by only the plurality of disparate optimization work machines, during optimization sessions for optimization work requests. The shared work queue may function to prioritize incoming optimization work request in the order of receipt (first in, first out—FIFO) or in any suitable manner including based on urgency of the work request and the like. For instance, S220 may function to prioritize the received optimization work requests (assuming the receipt of two or more) in order of importance or calculated importance by the intelligent optimization platform. An importance of an optimization work request may be determined based on data provided with the optimization work request, such as an urgency value or requested date or time of completion assigned to the optimization work request. Thus, the shared work queue may function to order optimization work request based on a requested completion date provided or generated for an optimization work request.

Additionally, or alternatively, S220 may function to correlate or electronically identify a plurality of optimization work requests as being part of a same, singular, or related group based on an identification of an originator of the plurality of work requests. The association of the plurality of optimization work request may function to inform a system implementing the method 200 to ensure variance in the manner in which the optimization trials or tuning operations are performed against the member optimization work requests of the group. In this way, duplicate or near duplicate optimization results for two disparate optimization work requests are not produced and thereby, eliminating the possibility of redundancy and waste of an optimization trial. For instance, S220 may function to vary a selection strategy for the tuning sources that perform one or more tuning operations for the member optimization work requests, such that a same selection strategy is not duplicated or duplicated only a limited number of times for the member optimization work requests.

Additionally, S220 may function to implement or operate the plurality of disparate work machines asynchronously for performing a plurality of disparate tuning operations or the like. That is, S220 may implement each of the plurality disparate, optimization work machines such that they may operate in parallel and independent of other optimization work machines operating to process an optimization work request. In this regard, the interdependence of the plurality of disparate, optimization work machines maybe very limited and preferably, non-existent, such that each of the plurality of disparate, optimization worker machines may complete work on an optimization work request at different times. However, it shall be noted that some of the disparate optimization worker machines may function to pass resultant data of a tuning operation to another optimization worker machine for performing an additional and/or different tuning operation. Accordingly, in some embodiments, the plurality of disparate, optimization machines may function to work at different paces and on different optimization work request at any given time.

At least a first technical benefit of the asynchronous implementation of the plurality of disparate, optimization work machines includes an ability by a system implementing the method 200 to service an API request for suggestions or a status on a partially completed or pending optimization work request. In such circumstance, the system implementing the method 200 may formulate and/or collect status information and/or suggestions (e.g., a response to optimization work request) from a platform database or the like based on partial information provided by each of the plurality of disparate, optimization worker machines even if all of the optimization work machines have not completed their work on the subject optimization work request, which is discussed in more detail below.

At least a second technical benefit of the asynchronous implementation of the plurality of disparate, optimization work machines includes minimizing or mitigating an effect of a failed optimization work machine. That is, even if one or more of the optimization work machines fails, a system implementing the method 200 may function to provide a suggestion to an optimization work request based on partial information from the remaining active and/or operable optimization work machines.

The plurality of disparate, optimization worker machines may include any number and type of worker machine that functions to optimize and/or tune one or more aspects of the optimization work request and components (e.g., tuning sources) of the system implementing the method 200. For instance, the plurality of disparate, optimization work machines may include a first optimization worker machine that functions to reconfigure and optimize hyperparameters of member optimization models of an ensemble of optimization models, a second optimization worker machine that functions to generate the suggestions for new parameter values of the hyperparameters provided in the optimization work request, a third optimization worker machine that functions to suggest an importance and/or weight an importance of the hyperparameters provided in an optimization work request and/or hyperparameters of a member model of the ensemble of optimization models.

S230, which includes dynamically selecting one or more optimization and/or tuning sources of an ensemble of optimization models based on the optimization work request data, functions to enable each of the plurality of optimization worker machines processing the optimization work request to select one or a combination of optimization models to perform optimization of the parameters assigned to the respective optimization worker machine. The ensemble of optimization models includes a plurality of disparate optimization models or tuning sources that function to optimize parameters differently. Preferably, each of the optimization models defining the ensemble implements a variant of a Bayesian optimization algorithm or a comparable technique (Bayesian Global Optimization model, etc.). Accordingly, assuming an input of a same set of hyperparameters for optimization, each of the optimization models of the ensemble may function to process results with varying hyperparameters values, efficiency, speed or scale, and quality. The scope and variety of optimization models of the ensemble enables acceptable and preferred variances in the optimization selection strategies of the optimization work machines.

Specifically, in a preferred embodiment, an optimization worker machine may function to select an appropriate optimization model or combination of optimization models from the ensemble based on a number of dimensions or hyperparameters involved in the optimization work request. In such embodiment, the optimization work request received via the intelligent API may function to trigger the dynamic selection of an optimization model from the ensemble by an optimization worker machine. S220 may configure each of the plurality of optimization worker machines with optimization model selection thresholds and related logic. For instance, S220 may enable a tuning source selection strategy for a given optimization worker machine based on various optimization factors including a value of an optimization budget, a number of dimensions (e.g., number of hyperparameters), requested optimization completion date, capacity of the system (e.g., availability of optimization worker machines in system 100), and/or any suitable factor derived from the optimization work request or from a status of a system implementing the method 200. In such instance, S220 may set selection strategy thresholds that if satisfied or not by a governing optimization factor (such as the aforementioned factors). For example, if an optimization budget for an optimization work request is large and satisfies or exceeds a selection strategy threshold (specific to optimization budgets), then an optimization worker machine may select one or more tuning sources that may optimize according to a large optimization budget. The opposite may be implemented for a small optimization budget. In another example, if requested optimization completion time is urgent or short such that the timeline satisfies an urgency selection threshold, an optimization worker machine may select tuning sources that enable a fast optimization of the hyperparameters of an optimization work request.

Accordingly, the optimization model selection threshold may be used by an optimization worker machine to determine which optimization model of the ensemble to select in use in its optimization processes. For instance, an optimization worker machine may be configured with three algorithm selection thresholds that enable a decision and selection of optimization models of an ensemble of three optimization models. In such instance, a first threshold may be set at two dimensions or below for selecting a first optimization model, a second threshold may be set at four dimensions or below for selecting a second optimization model, and a third threshold may be set at six dimensions or below for the specific optimization worker machine for selecting a third optimization model of the ensemble. In such example, if the optimization worker machine retrieves an optimization work request with three dimensions (e.g., three parameters for optimization), then it is likely that the optimization worker machine will select the second optimization model of the ensemble. However, in some circumstances, it is possible that the optimization work machine may select the third optimization model or both the second and third algorithms to process the optimization work request having three dimensions.

Each of the optimization worker machines may additionally be configured to consider additional factors, such as a current state of the system (e.g., the intelligent optimization platform) implementing the method 200, a current state of the shared work queue (e.g., an amount of existing optimization work requests), an urgency specified (e.g., timeline for completion, etc.) in the optimization work request, a current utilization of the core optimization engine including the ensemble of optimization models, failed or failing optimization worker machines, and the like. Preferably, the optimization model selection thresholds vary among the optimization worker machines since the optimization tasks performed by each of the plurality of optimization worker machines may vary and may not be the same.

In a preferred embodiment, S230 may enable an optimization worker machine to select a first tuning source from a plurality of distinct machine learning model tuning sources based on an optimization work request data and/or system data. In such embodiment, the first tuning source may include an optimization algorithm (e.g., a low-discrepancy configured to generate an arbitrary set of values for hyperparameters that is preferably constrained by bounds (i.e., max/min values for each hyperparameter). Thus, for example hyperparameters x and y, the first tuning source may randomly generate pairs of x and y values for an objective function that do not exceed prescribed bounds.

Further, S230 preferably enables an optimization worker machine to select a second tuning source from the plurality of distinct machine learning model tuning sources based on the optimization work request data and/or system data. In such embodiment, the second tuning source may include an optimization algorithm or the like that selectively identify hyperparameter values that function to optimize an objective function. That is, the second tuning source may function to test hyperparameter values within the objective function and identifying the hyperparameter values that optimize the objective function. In such embodiment, S230 may provide as input to the second tuning source, the arbitrary set of hyperparameter values initially generated at the first tuning source from which the second tuning source may performing the testing.

Even further, S230 preferably enables an optimization worker machine to select a third tuning source from the plurality of distinct machine learning model tuning sources based on the optimization work request and/or system data. The third tuning source may enable a testing of a smaller hyperparameter values dataset. In some embodiments, the third tuning source may function to test extreme values of the arbitrary hyperparameter values dataset to identify those hyperparameter values (possibly undiscovered by the second tuning source) that function to optimize the objective function. In such embodiment, S230 may pass the arbitrary set of hyperparameter values derived from the first tuning source as well as tuning results of the second tuning source to the third tuning source as input to enable the testing of the third tuning source.

It shall be noted that S230 may enable the optimization worker machines to select any number or type of tuning sources for performing tuning operations for an optimization work request.

Optionally, S240, which includes returning an API response based on partial information, functions to collect an API request for a partially completed optimization work request and trigger the implementation of a process for returning suggestions in response to the API request based mainly on partial information that has been generated via the plurality of optimization worker machines for an optimization work request that has not been fully completed or processed by a system implementing the method 200. Specifically, the API request may include a request for returning suggestions for hyperparameters of a previously submitted optimization work request that may be pending or in process of tuning but has not completed all stages of tuning for returning optimized and/or tuned suggestions. Accordingly, when it is detected that an API request has been received for returning suggestions based on optimization work request that has not been fully processed or optimized, a system implementing the method 200 may function to trigger an implementation of S240 to thereby generate optimal suggestions based on data of the partially completed optimization work request.

Additionally, based on a receipt of a mid-stream optimization work request, S240 may function to trigger an identification and/or aggregation of the data points generated by the plurality of optimization worker machines for servicing an optimization work request even when one or more of the plurality of optimization worker machines processing the optimization work request has not completed their respective processing of the optimization work request. In such case, the mid-stream optimization work request may be an optimization work request placed as a follow on to an initial or first optimization work request. The mid-stream optimization work request therefore operates to request results or suggestions of the initial or first optimization work request ahead of an estimated or a scheduled completion of the optimization processing thereof. Accordingly, S240 may function to access the database platform (or similar central repository of data generated by the tuning operations) and collect the suggestions and partial suggestions for new hyperparameter values for the one or more hyperparameters of the optimization work request. Additionally, S240 may function to access the database platform to collect the optimized hyperparameter values generated by the one or more optimization models that were selected to process one or more aspects of the optimization work request.

Additionally, S240 may function to trigger the generation of a surrogate model specifically configured by one or more of the optimization models of the ensemble to test a performance of the collected suggested hyperparameter values and optimized hyperparameter values. Accordingly, S240 may cause a selected optimization model (e.g., MOE) of the ensemble to generate (or be transformed into) a suitable surrogate model (or machine learning model) using the latest or most recent optimized hyperparameters generated by at least the first optimization worker machine (implementing Hyperopt or the like) that functions to optimize hyperparameters. S240 may provide the suggested parameter values as input into the surrogate model to determine a certainty or probability of improvement with which the suggested parameter values may improve a performance of a user's external model (complex system or simulation).

Further, S240 may function to rank each of the sets of parameter values provided as input into the surrogate model based on the confidence value or the probability of improvement value generated by the surrogate model.

Lastly, S240 may pass via the intelligent API a partial response including the ranked hyperparameter values and optionally, with the associated generated confidences and/or probabilities of improvement values. The ranking of the hyperparameter values may preferably be performed by the selected optimization model that generated the surrogate model. However, it shall be noted that any suitable ranking system may be implemented. In some embodiments, the partial response may include an estimate of a time remaining before a full response may be made available by the system implementing the method 200.

Additionally, it shall be noted that full and/or completed responses may also be ranked in a similar manner as parameter values of a partial response.

S250, which includes making available the suggestions to the intelligent API, functions to store at the platform database all the data points and values computed for a given optimization work request. In some embodiments, S250 functions to provide an indication and/or notification via the intelligent API that an optimization work request is completed.

Optionally, S255, which includes implementing an optimization feedback loop, functions to enable an optimization feedback loop for optimizing parameter values based on actual or real-world observed data values. The observations data, as referred to herein, may generally refer to observed data that is collected during a trial implementing of an external model (e.g., a user's model) having the suggested parameter values as input.

Accordingly, once the generated suggestions are made available to a user's system, real-world implementation of the suggestions parameter values may be performed using an external model and the observed results of a measured metric of the model (e.g., observations data) may be reported back via the intelligent API. The report of the observations data may trigger or continue an optimization feedback loop that involves the receipt of observations data, the generation of new suggestions based at least in part on the observations data and making the updated suggestions available to the user's system via the intelligent API. The optimization feedback loop may persist until a desired value of the measured metric of the external model is achieved.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A machine learning-based system comprising:
 a number of tuning worker machines to operate in parallel to set a tuning operation for tuning hyperparameters of an external model based on one or more tuning parameters of a tuning work request, the number of tuning worker machines including:
  a first tuning worker machine to set a first tuning operation to reconfigure second hyperparameter values of a tuning source, the tuning source to tune hyperparameters of the external model; and
  a second tuning worker machine to set a second tuning operation to generate suggestions of first hyperparameter values, the first hyperparameter values to replace the hyperparameters of the external model, the first tuning worker machine and the second tuning worker machine to operate in parallel; and
tuning sources to:
  generate a plurality of first the first hyperparameter values for the hyperparameters of the external model based on the second tuning operation;
  generate, in response to a status request corresponding to a partially complete tuning work request, a surrogate model to test an efficacy of third hyperparameter values generated before the status request; and
  cause the second tuning worker machines to return the second hyperparameter values for the hyperparameters of the external model as a response to the tuning work request.

2. The machine learning-based system of claim 1, wherein the number of tuning worker machines are to:
  test an efficacy of the first hyperparameter values for the hyperparameters of the external model; and
  identify a subset of the first hyperparameter values based on the testing to return as the response to the tuning work request.

3. The machine learning-based system of claim 1, wherein the tuning sources include one of a machine learning-based optimization source and a Bayesian-based optimization source.

4. The machine learning-based system of claim 1, wherein ones of the number of tuning worker machines are implemented by computers or computing servers that enable the number of tuning worker machines to operate at least one of independently or in parallel.

5. The machine learning-based system of claim 1, wherein the number of tuning worker machines are to test the efficacy of the third hyperparameter values of the surrogate model against at least one objective function of the external model.

6. The machine learning-based system of claim 1, wherein the number of tuning worker machines are to:
  estimate a structure of the external model based on at least one or more objective functions of the external model; and
  generate the surrogate model utilizing at least one of the tuning sources.

7. The machine learning-based system of claim 1, further including an application programming interface to operably interface with the number of tuning worker machines to configure the tuning work request.

8. The machine learning-based system of claim 1, further including an asynchronous work queue to store a plurality of tuning work requests accessible by the number of tuning worker machines for asynchronous processing.

9. The machine learning-based system of claim 1, wherein:
  the external model includes a machine learning model; and
  the tuning work request indicates hyperparameters to be tuned for the machine learning model and one or more tuning constraints defining one or more tuning parameters that constrain one or more tuning operations when tuning the hyperparameters.

10. The machine learning-based system of claim 9, wherein the one or more tuning constraints include:
  (i) a tuning budget that limits a number of tuning operations of the number of tuning worker machines against the hyperparameters of the machine learning model; and
  (ii) bounded data that identifies a maximum value and minimum value for ones of the hyperparameters, the bounded data to limit discoverable values for the ones of the hyperparameters during the one or more tuning operations.

11. The machine learning-based system of claim 1, wherein the tuning sources are to:
  execute the tuning work request to tune the hyperparameters of the external model based on an estimated time of completion;
  obtain an intervening tuning work request corresponding to a second tuning work request that is received at a time during the execution of the tuning work request before the estimated time of completion of the tuning work request; and
  in response to obtaining the intervening tuning work request, automatically switch between the tuning sources to expedite an evaluation of fourth hyperparameter values generated before the estimated time of completion.

12. The machine learning-based system of claim 1, wherein in response to returning the first hyperparameter values, the tuning sources are to improve an effectiveness of the external model by tuning the external model using one or more of the first hyperparameter values.

13. The machine learning-based system of claim 1, wherein the tuning sources are to generate, in response to a tuning worker machine of the number of tuning worker machines failing, the second hyperparameter values for the hyperparameters of the external model based on partial information from a subset of the number of tuning worker machines that remain operable.

14. A method for tuning an external model, the method comprising:
  setting a first tuning operation to reconfigure second hyperparameter values of a tuning source, the tuning source to tune hyperparameters of the external model;
  setting a second tuning operation to generate suggestions of first hyperparameter values, the first hyperparameter values to replace the hyperparameters of the external model based on one or more tuning parameters included in a tuning work request, the first tuning operation and the second turning operation operating in parallel;
  generating, using one or more tuning sources, the first hyperparameter values for the hyperparameters of the external model based on the second tuning operation;
  generating, in response to a status request corresponding to a partially complete tuning work request, a surrogate model to test an efficacy of third hyperparameter values generated before the status request; and
  returning, via an application programming interface, the first hyperparameter values for the hyperparameters of the external model as a response to the tuning work request.

15. The method of claim 14, further including:
  testing an efficacy of ones of the first hyperparameter values for the hyperparameters of the external model; and identifying a subset of the first hyperparameter values based on the testing to return as the response to the tuning work request.

16. The method of claim 14, wherein generating the first hyperparameter values includes utilizing one of a machine learning-based optimization source and a Bayesian-based optimization source.

17. The method of claim 14, wherein setting the second tuning operation includes setting a plurality of tuning operations independently or parallelly utilizing a number of different computers or a number of different computing servers.

18. The method of claim 14, further including testing the efficacy of the second third hyperparameter values of the surrogate model based at least on an objective function of the external model.

19. The method of claim 14, further including estimating a structure of the external model based on at least one or more objective functions of the external model.

20. The method of claim 14, further including:
selecting a first tuning source of a plurality of tuning sources to generate the first hyperparameter values;
providing hyperparameter data corresponding to the hyperparameters of the external model and tuning constraint data derived from the tuning work request to the selected first tuning source to enable a third tuning operation by the first tuning source; and
generating first tuning data based on the third tuning operation.

21. The method of claim 20, further including:
selecting a second tuning source of the plurality of tuning sources that is different than the first tuning source;
providing the hyperparameter data corresponding to the hyperparameters of the external model and the tuning constraint data derived from the tuning work request to the selected second tuning source to enable a fourth tuning operation by the second tuning source; and
generating second tuning data based on the fourth tuning operation.

22. The method of claim 14, further including:
determining that a tuning worker machine of a number of tuning worker machines fails during the first tuning operation; and
generating, in response to the tuning worker machine failing, the first hyperparameter values for the hyperparameters of the external model based on partial information from a subset of the number of tuning worker machines that remain operable.

* * * * *

UNITED STATES PATENT AND TRADEMARK OFFICE
CERTIFICATE OF CORRECTION

PATENT NO. : 11,301,781 B2
APPLICATION NO. : 16/796489
DATED : April 12, 2022
INVENTOR(S) : Patrick Hayes et al.

It is certified that error appears in the above-identified patent and that said Letters Patent is hereby corrected as shown below:

In the Claims
Column 17, Line 14 (Claim 1): Delete "a plurality of first"

Signed and Sealed this
Fifth Day of July, 2022

Katherine Kelly Vidal
*Director of the United States Patent and Trademark Office*